United States Patent
Soltis, Jr. et al.

(10) Patent No.: US 6,587,940 B1
(45) Date of Patent: Jul. 1, 2003

(54) LOCAL STALL/HAZARD DETECT IN SUPERSCALAR, PIPELINED MICROPROCESSOR TO AVOID RE-READ OF REGISTER FILE

(75) Inventors: Donald Charles Soltis, Jr., Fort Collins, CO (US); Rohit Bhatia, Fort Collins, CO (US)

(73) Assignee: Hewlett-Packard Development Company, Houston, TX (US)

( * ) Notice: Subject to any disclaimer, the term of this patent is extended or adjusted under 35 U.S.C. 154(b) by 0 days.

(21) Appl. No.: 09/483,774

(22) Filed: Jan. 18, 2000

(51) Int. Cl.⁷ .............................. G06F 9/30; G06F 9/38
(52) U.S. Cl. .................. 712/216; 712/219; 712/245; 711/125
(58) Field of Search ........................... 712/219, 218, 712/245, 228, 216; 711/214, 213, 125, 123

(56) References Cited

U.S. PATENT DOCUMENTS

| | | | | |
|---|---|---|---|---|
| 5,859,999 | A | | 1/1999 | Morris et al. ............... 395/565 |
| 5,860,017 | A | | 1/1999 | Sharangpani et al. .. 395/800.23 |
| 5,870,580 | A | * | 2/1999 | Walker ....................... 712/218 |
| 6,038,658 | A | | 3/2000 | Chow ......................... 712/219 |
| 6,279,100 | B1 | | 8/2001 | Tremblay et al. ............. 712/24 |
| 6,401,195 | B1 | * | 6/2002 | Arora et al. ................ 712/218 |

FOREIGN PATENT DOCUMENTS

| | | | |
|---|---|---|---|
| EP | 0992896 A1 | 4/2000 | ............. G06F/9/38 |
| GB | 2334122 A | 8/1999 | ............. G06F/9/38 |
| GB | 2348526 A | 10/2000 | ............. G06F/9/38 |

OTHER PUBLICATIONS

Wolfe, A., "Patents shed light on Merced's Innards", Electronic Engineering Times, Feb. 15, 1999.

* cited by examiner

Primary Examiner—Daniel H. Pan

(57) ABSTRACT

A method and apparatus that utilizes a simplified, localized version ("a local data-dependency stall") of a global data-dependency stall to avoid re-reading of a register file to improve the performance of a pipelined microprocessor. A non-asserted local data-dependency stall indicates that source operand for an instruction is correct. Accordingly, when a global data-dependency stall arrives, the instruction is stalled in a stage without re-reading the register file. Without the simplified, localized version of the global data-dependency stall, the source operand data is not known to be correct and is indeed assumed to be incorrect. Therefore, when the global data-dependency stall arrives, a complete re-computation of the source operand data must be performed, including a re-read of the register file. Likewise, an asserted local data-dependency stall indicates that source operand for an instruction is not correct. Accordingly, the instruction is stalled when the local data-dependency stall is asserted and until the data for the instruction is available. The available data is forwarded directly to the stalled instruction.

19 Claims, 11 Drawing Sheets

Figure 2 - Prior Art

```
                    STANDARD         LOCAL
                    PIPELINE         PIPELINE

REN
                     REN             | REC
                     | REG           | | REG
                     | | EX1         | | | EX1       localReg
                     | | | EX2       | | | | EX2     | localEx1
                     | | | | WRB     | | | | | WRB   | | stallEx1
           CYCLE     | | | | |       | | | | | |     | | |
           ---------|-------------|-----------------|---------
              0     | C B A - -   | C   B A - -     | 0 0 0
                    |             |   B             |
           RegFile  |             |   B             |
            OpReg   |             |   B             |
           ---------|-------------|-----------------|---------
              1     | D C B A -   | D   C B A -     | 0 0 0
                    |             |   C             |
           RegFile  |             |   C             |
            OpReg   |             |   C             |
           ---------|-------------|-----------------|---------
              2     | E D C B A   | E   D C B A     | 0 0 1
                    |             |   D             |
           RegFile  |             |   D             |
            OpReg   |             |   D             |
           ---------|-------------|-----------------|---------
              3     | E D C - B   | E   D C - B     | 0 0 0
                    |             |   D             |
           RegFile  |             |   D             |
            OpReg   |             |   D             |
           ---------|-------------|-----------------|---------
              4     | F E D C -   | F   E D C -     | 0 0 0
                    |             |   E             |
           RegFile  |             |   E             |
            OpReg   |             |   E             |
           ---------|-------------|-----------------|---------
```

FIGURE 8

```
            STANDARD      LOCAL
            PIPELINE      PIPELINE

REN
            REN           | REC
            | REG         | | REG
            | | EX1       | | | EX1        localReg
            | | | EX2     | | | | EX2      | localEx1
            | | | | WRB   | | | | | WRB    | | stallEx1
    CYCLE   | | | | |     | | | | | |      | | |
    --------|-------------|----------------|---------
       0    | C B A - -   | C   B A - -    | 0 0 0
            |             |   B            |
    RegFile |             |   B            |
    OpReg   |             |   B            |
    --------|-------------|----------------|---------
       1    | D C B A -   | D   C B A -    | 1 0 0
            |             |   C            |
    RegFile |             |   C            |
    OpReg   |             |   x            |
    --------|-------------|----------------|---------
       2    | E D C B A   | E   C - B A    | 0 1 1
            |             |   D            |
    RegFile |             |   D            |
    OpReg   |             |   C            |
    --------|-------------|----------------|---------
       3    | E D C - B   | E   D C - B    | 0 0 1
            |             |   D            |
    RegFile |             |   D            |
    OpReg   |             |   D            |
    --------|-------------|----------------|---------
       4    | E D C - -   | E   D C - -    | 0 0 0
            |             |   D            |
    RegFile |             |   D            |
    OpReg   |             |   D            |
    --------|-------------|----------------|---------
       5    | F E D C -   | F   E D C -    | 0 0 0
            |             |   E            |
    RegFile |             |   E            |
    OpReg   |             |   E            |
    --------|-------------|----------------|---------
```

FIGURE 9

LOCAL STALL/HAZARD DETECT IN SUPERSCALAR, PIPELINED MICROPROCESSOR TO AVOID RE-READ OF REGISTER FILE

FIELD OF INVENTION

The invention relates to computers and superscalar, pipelined microprocessors. More particularly, this invention relates to the method and apparatus for improving the performance of pipelined microprocessors.

BACKGROUND OF THE INVENTION

Typical computer systems have a number of common components. These components, as seen in FIG. 1, include a CPU, a bus, memory, and peripheral devices. In high-speed computers, the CPU may be a superscalar, pipelined microprocessor. As shown in FIG. 2, a superscalar, pipelined microprocessor can include an instruction fetch unit, multiple pipelines, and a centralized data-dependency hazard detection mechanism. The instruction fetch unit fetches instructions and forwards them to a pipeline. In the pipeline, the instructions flow through multiple pipeline stages, after which the results of the instructions are committed to an architectural state (i.e., memory).

The stages in a standard pipelined microprocessor may include: a rename register identification or instruction decode stage ("REN"); a register reading or operand fetch stage ("REG"); a first instruction execution stage ("EX1"); a second instruction execution stage ("EX2"); and a write-back stage ("WRB"). A pipelined microprocessor performs parallel processing in which instructions are executed in an assembly-line fashion. Consecutive instructions are operated upon in sequence, but several instructions are initiated before a first instruction is complete. In this manner, instructions step through each stage of a particular pipeline, one instruction per stage per pipeline at a time. For example, a first instruction is fetched and then forwarded to the REN stage. When the first instruction is finished in the REN stage, i.e., it is decoded and the instruction's register identification ("RegID") is renamed from virtual to real space, it is forwarded to the REG stage and a second instruction is fetched and forwarded to the REN stage. This process continues until each instruction makes its way through every stage of the pipeline. However, in some situations, as discussed below, it is necessary to stall an instruction or multiple instructions in the pipeline. Stalling an instruction involves holding the instruction in a stage of the pipeline until the situation is resolved and the stall is no longer asserted.

Instructions in pipelined microprocessors have producers and consumers. In a pipelined microprocessor, one instruction in an earlier stage (e.g., REG) may be dependent (a consumer) on data from an instruction (producer) in a later stage (e.g., EX1 or EX2). A producer is an instruction generating data, such as an add instruction. A target register is where the producer is going to write the results (destination operands) of the add. There may be a following add instruction which is earlier in the pipeline—earlier means it is a younger instruction in program order—that takes the results of the first add instruction from the target register (its source register) and adds it to something else, creating a second result. Therefore, the second add instruction is a consumer, and the relationship between the consumer and the producer is called a data-dependency. The process of the consumer reading data from its source register is known as consumer operand generation.

Often times it takes an instruction multiple stages or cycles before it completes its operation and the data generated by the instruction is available. This delay or latency can vary from instruction to instruction, with simple instructions taking one stage (one-cycle latency) and complex instructions taking multiple stages (multiple-cycle latency). If a producer has multiple-cycle latency, then its data will not be available to the consumer until the producer moves to a later stage and completes its operation. Such a situation is called a data-dependency hazard, and if a code segment is written with the consumer immediately following the producer or otherwise not separated by enough pipeline stages from the producer, the hardware has to detect the data-dependency hazard. In this situation, the hardware must stall the consumer in some pipeline stage until the producer can make its data available.

As illustrated in FIG. 2, conventional superscalar pipelined designs have a centralized data-dependency hazard detection mechanism whose output is a stall signal. This stall signal is a global stall that effectively holds the consumer in the EX1 stage, the stage where the consumer is waiting for its source operands because the global stall arrives after the consumer has moved from the REG stage. The global stall applies to all pipelines and all stages prior to and including the stage in which the data-dependency hazard is detected. The centralized data-dependency hazard detection circuitry detects all possible consumer-producer data-dependency hazards. The global stall signal that is generated must traverse earlier pipeline stages—to stall something in the REG stage, the stall must traverse any prior stages, such as the REN stage. Likewise, the global stall signal must traverse the physical dimensions of the CPU to move back across stages. The distance alone across the die of a CPU can be relatively long, and there are usually a large number of stages.

Accordingly, arrival of the global stall signal at any one point may be late in a cycle, giving late notice of a stall. The resulting late notice increases when additional pipelines are added because it takes a non-linear increase in the amount of logic to generate the global stall as the number of pipelines is increased. This non-linear calculation is a function of the number of source operands by the width or number of pipelines by the depth of the pipelines (or number of stages). Consequently, faster circuitry is required with the global stall in order to operate at intended frequencies. This circuitry can limit the entire CPU frequency of operation.

Another problem with the late arrival of the global stall is that it necessitates a complete recalculation of data-forwarding architecture, including a register file re-read to ensure correct operand data. If consumer instructions Y1 and Y2 are in the REG stage when a data-dependency hazard occurs for an operand of Y1, the global stall may not arrive or be asserted until Y1 and Y2 are already in a later stage, such as the EX1 stage. Since there was a data-dependency hazard for an operand of Y1 when Y1 was in the REG stage and Y1 was forwarded to the EX1 stage before the global stall arrived (i.e., before the producer instruction finished its computation and made its data available for Y1), the data in Y1 is incorrect. Y1 will receive the correct data from its producer via the data-forwarding architecture when the producer data is available.

Since there was no data-dependency hazard for Y2, the data for Y2 is correct. However, since the global stall does not indicate in which pipeline nor for which instruction in REG the data-dependency hazard occurred, the operand data for each instruction forwarded to the EX1 stage must be re-read during every cycle of the global stall to ensure correct data. Consequently, despite the fact that Y2 read the correct data while in REG, Y2 must re-read the register and re-compute during every cycle of the stall.

Re-reading is problematic considering that there are multiple source registers for each pipeline. Therefore, if there are six execution pipelines and two source operands per instruction, there are a total of twelve different register values which must be read from the register file. These registers values will be used unless there is data-forwarding from a producer in a later stage of pipeline. As discussed above, data-forwarding is performed for the consumer with the data-dependency hazard. The data-forwarding architecture performs calculations necessary to forward the data generated by producer instructions. If a producer is in-flight, it has not written to the register file yet and a consumer can read directly from the producer when its data is available. However, if the consumer moves to a later stage when there is a data-dependency hazard, the data-forwarding architecture must re-compute the calculations necessary to forward the data, based on the consumer's new location.

In sum, re-reading of the register files and re-calculating the data-forwarding architecture can be time and resource consuming. This requirement restricts the performance of a superscalar pipeline microprocessor and can make it difficult for the entire CPU to operate at the desired frequencies of operation.

SUMMARY OF THE INVENTION

The present invention is a method and apparatus that generates a localized and simplified version of the global stall ("a local stall") and uses the local stall to improve the operation of a pipelined microprocessor. The invention locates simplified data-dependency hazard detection nearer to the consumer operand generation than the centralized data-dependency hazard detection, thereby overcoming the inherent problems in centralized data-dependency hazard detection discussed above. The simplified data-dependency hazard detection reuses existing circuitry from a data forwarding architecture to generate a local stall. Accordingly, the simplified data-dependency hazard detection can generate a local stall with a very limited increase of logic by re-using data forwarding circuitry.

In the present invention, the local stall is utilized to avoid the necessity of a register re-read. The register address or RegID for an instruction's source operand(s) is applied for and acquired during the REN stage. The RegID indicates the location (or the address) of the source operand data in the register file. The RegID is used during the REG stage to read the source operand data from the register file, making the data available for the instruction during the REG stage. With a simplified data-dependency hazard detection, if no local stall is asserted, the source operand data for the instruction in the REG stage of a local pipeline is known to be correct. Accordingly, the instruction in the REG stage of a local pipeline is forwarded to the next stage, EX1, and held according to the global stall, which arrives in the next cycle. Since the non-assertion of a local stall indicates that the source operand data is correct, an override of the global stall is not indicated and the necessity for a re-read of the register is avoided and the overall performance and frequency of the CPU is improved.

If a local stall is asserted, the source operand data for the instruction in the REG stage is known to be incorrect, and is discarded. Accordingly, when the producer data becomes available, which will be the first cycle the local stall in REG is de-asserted, the source operand for the instruction in the REG stage is updated with this correct data and then held according to the global stall, which arrives in the next cycle. Accordingly, recalculation of the data-forwarding architecture is avoided and the overall performance and frequency of the CPU is improved.

BRIEF DESCRIPTION OF THE DRAWINGS

FIG. 8 is a second chart illustrating the operation of the superscalar, pipelined microprocessor according to the present invention.

FIG. 9 is a third chart illustrating the operation of the superscalar, pipelined microprocessor according to the present invention.

DETAILED DESCRIPTION OF THE INVENTION

The invention is a method and apparatus for utilizing a local stall to avoid re-reading the register file. The local stall is a simplified version of the global stall and can be generated earlier than the global stall. The invention locates simplified data—dependency hazard detection—which reuses circuitry involved in data forwarding calculations—nearer the consumer operand generation. The invention is best understood by first explaining how the local stall is generated by a simplified hazard detection and then describing in detail how the local stall is utilized to avoid re-reading the register file. In the description below, the pipeline stages discussed are REN, REG, EX1, EX2, and WRB, although the invention may be used with any variety of pipeline stages and combinations of pipeline stages.

Figure 1:
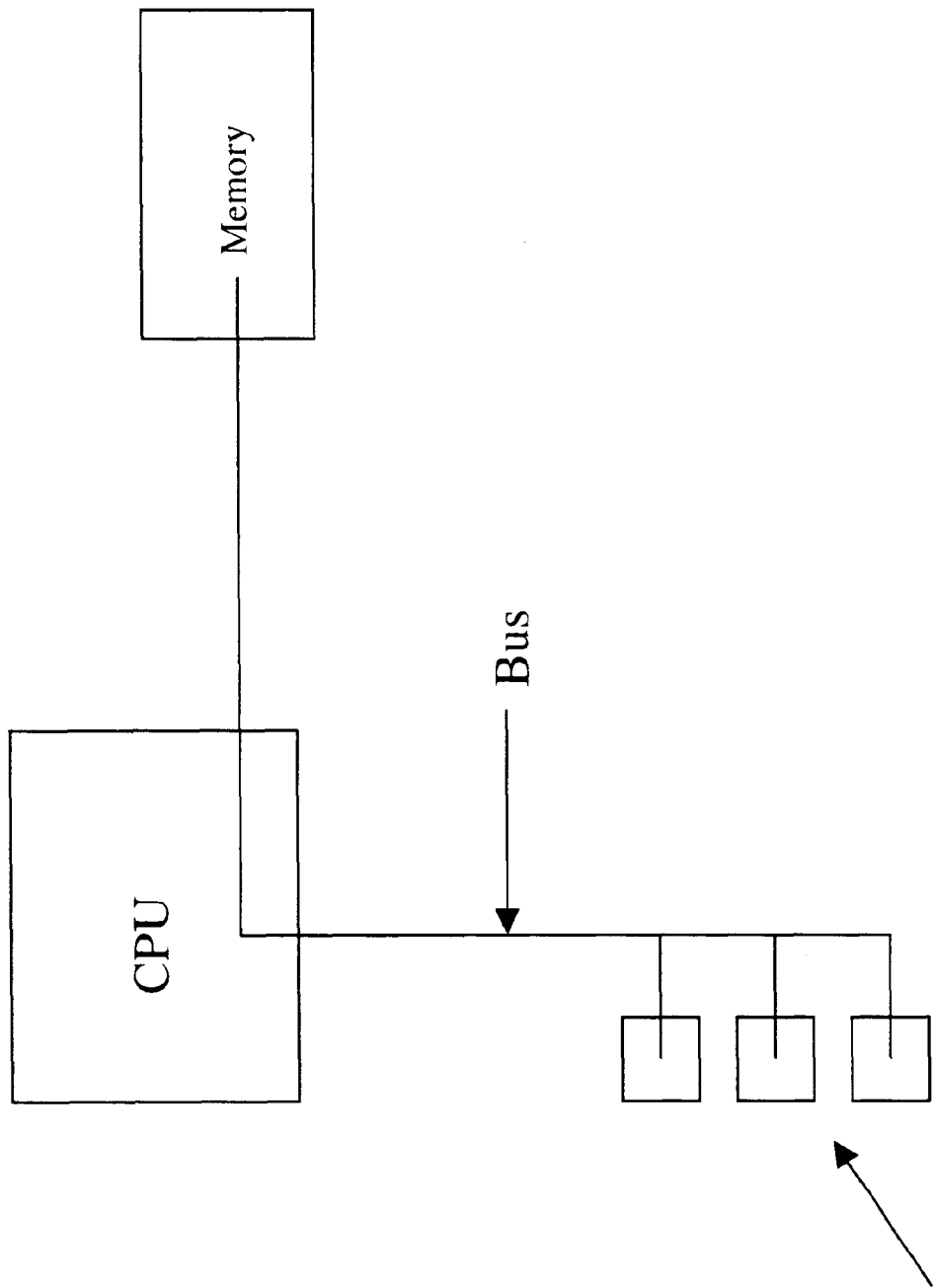
FIG. 1 is a block diagram of a computer system.
Figure 2:
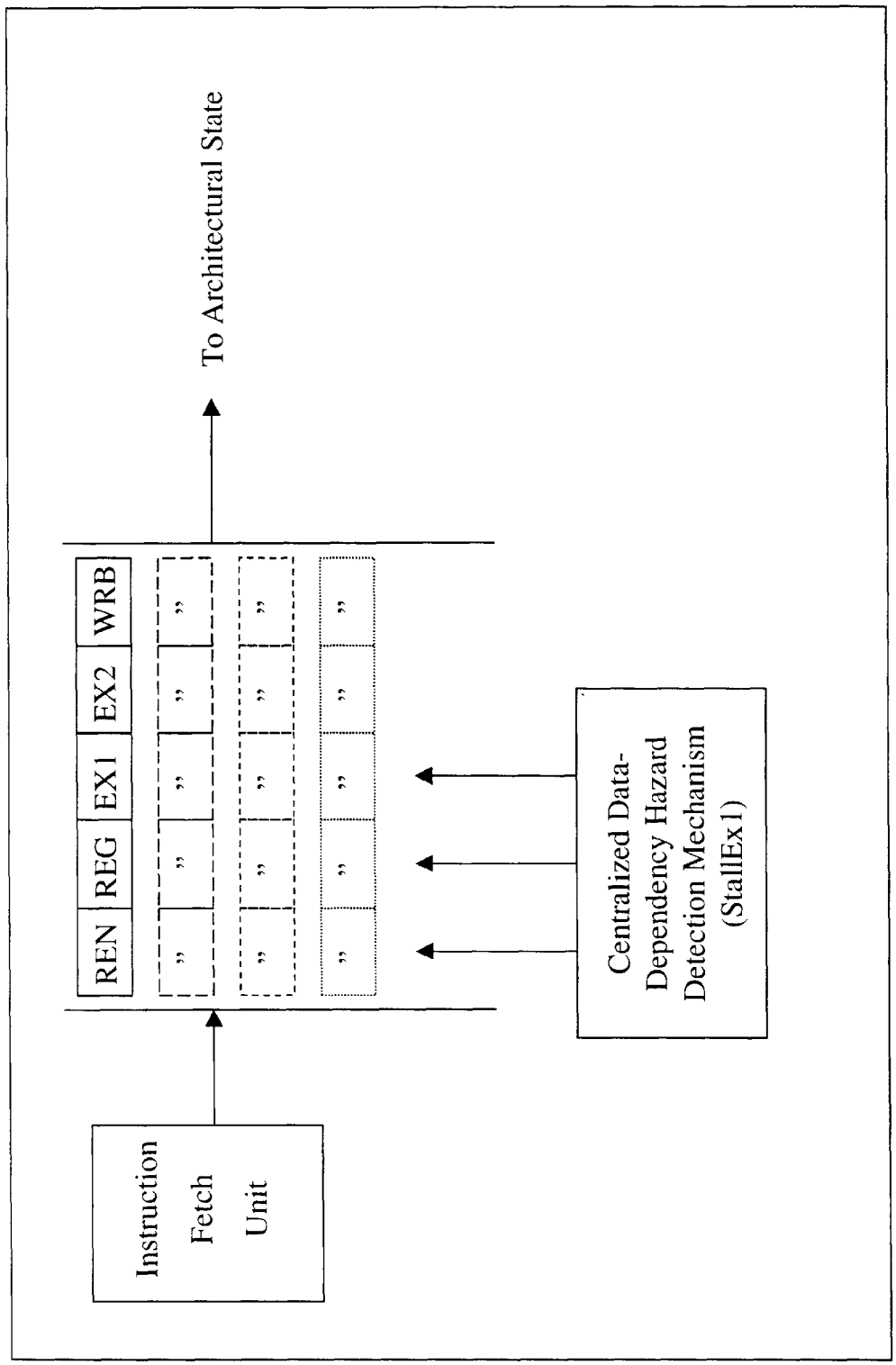
FIG. 2 is a block diagram of a prior art superscalar, pipelined microprocessor.
Figure 3:
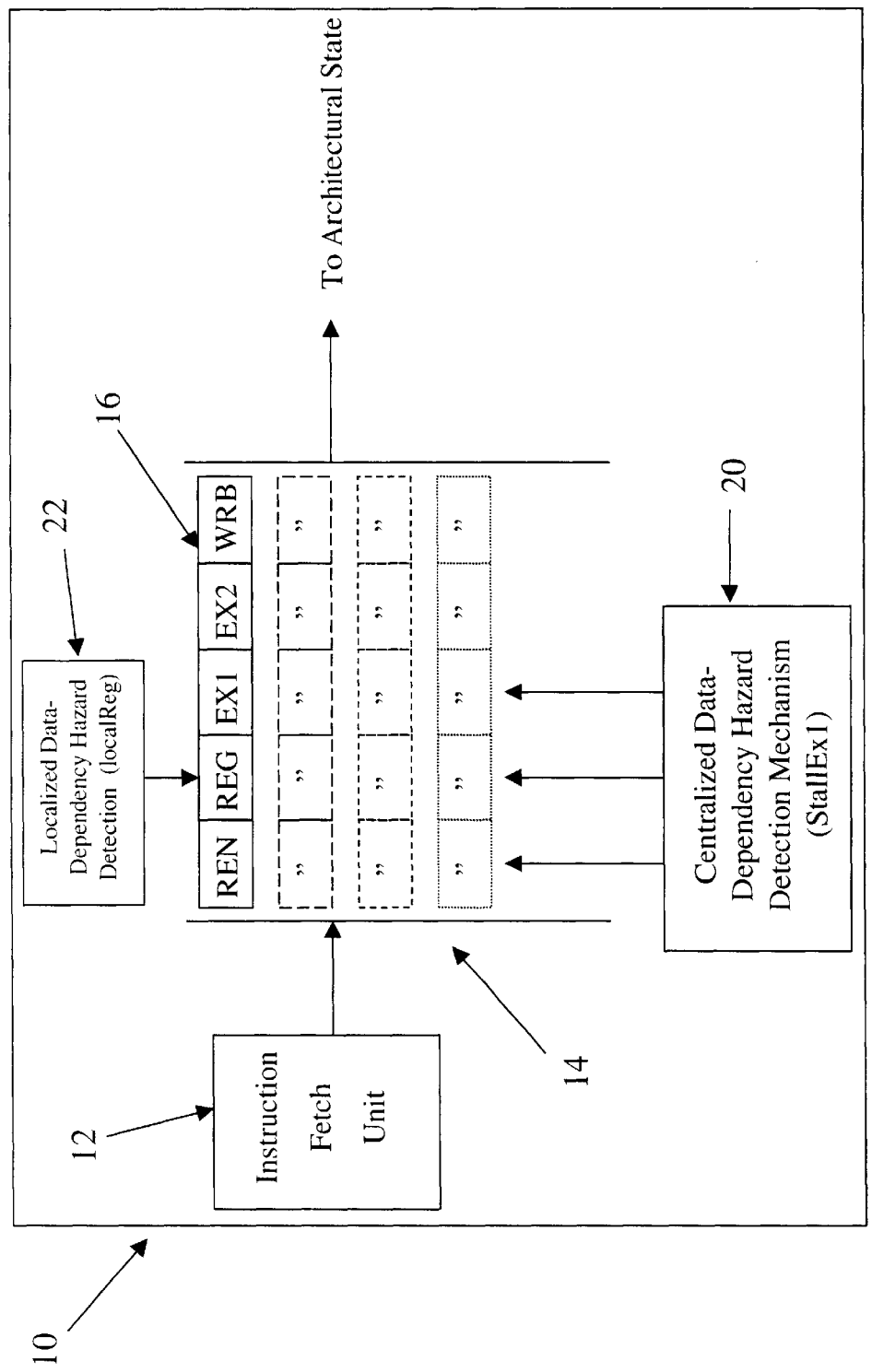
FIG. 3 is a block diagram of a superscalar, pipelined microprocessor with a simplified data-dependency hazard detection.

FIG. 3 illustrates a superscalar pipelined microprocessor 10 according to the present invention. Like the microprocessor shown in FIG. 2, the superscalar pipelined microprocessor 10 includes: an instruction fetch unit 12; multiple pipelines 14, which include a local pipeline 16; and a centralized data-dependency hazard detection mechanism 20. The superscalar pipelined microprocessor 10 also includes a local or simplified data-dependency hazard detection 22 associated with the local pipeline 16. The simplified data-dependency hazard detection 22 generates a local stall on a per operand basis applying to one stage of the local pipeline 16

Figure 4:
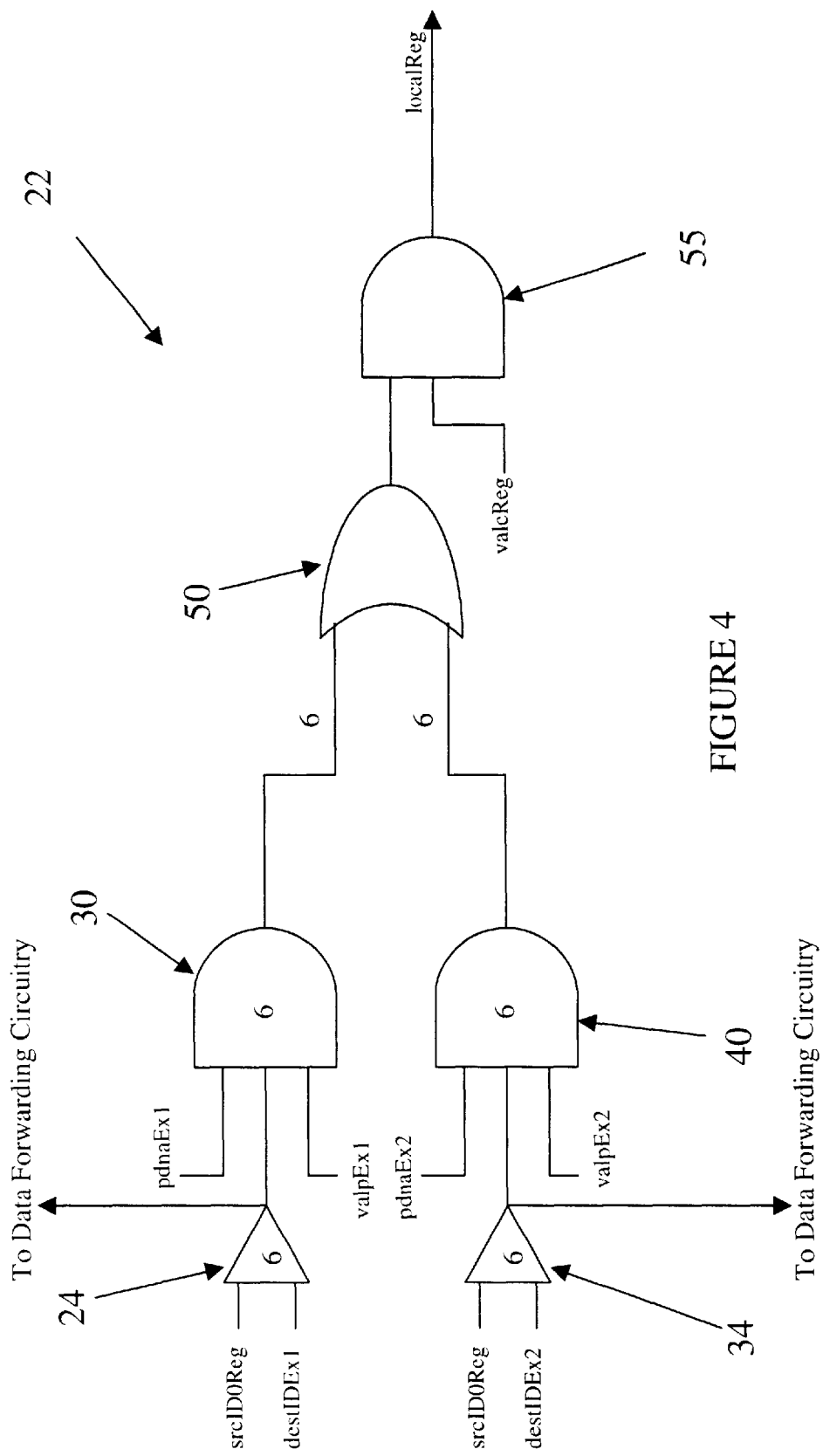
FIG. 4 is a logic circuit diagram of the simplified data-dependency hazard detection.

FIG. 4 shows the simplified data-dependency hazard detection 22 in greater detail. The simplified data-dependency hazard detection 22 generates the local stall, symbolized by localReg, for the REG stage of the local pipeline 16 by performing operand-specific calculations. The simplified data-dependency hazard detection 22 can be modified to generate the local stall on a pipeline or multiple-stage basis. So modified, the simplified data-dependency hazard detection 22 would perform multiple-operand calculations to generate the local stall.

The simplified hazard detection 22 uses outputs from comparators 24, 34 to perform the operand calculations. These comparators 24, 34 are part of the data-forwarding architecture already present in the superscalar pipelined microprocessor 10. This is indicated by the output from the comparators 24, 34 "to data-forwarding architecture."

A first comparator 24 has as its inputs a source operand RegID in the REG stage and a destination operand RegID in the EX1 stage. As seen in FIG. 4, these two inputs are srcID0Reg and destIDEx1, respectively. SrcID0Reg identifies the source register for a consumer instruction in the REG stage of the local pipeline 16 and destIDEx1 identifies the destination register for producer instructions in the EX1 stage in multiple pipelines.

In the example shown, there are six (6) execution pipelines and, therefore, a total of six producers in the EX1 stage of these six pipelines. The "6" on the first comparator 24 indicates that the first comparator 24 has six wires coming out of it, one wire for each producer in each EX1 stage of each pipeline. Accordingly, the first comparator 24 performs six comparisons between srcID0Reg and destIDEx1, to find a data-dependency between the consumer instruction in REG and one of the six producer instructions in EX1. If the source register is the same as the destination register for one of the six producers, i.e., srcID0Reg and destIDEx1 match for one of the producers, then there is a data-dependency and the producer is a matched producer. As a result, the first comparator 24 asserts an output on the wire for the producer in EX1 on which the consumer in REG is data-dependent (i.e, the matched producer).

The outputs of the first comparator 24 are input into a first AND gate 30. The first AND gate 30 has two additional inputs. The other two inputs of the first AND gate 30 are a valid producer in EX1 signal, represented by valpEx1, and a producer data not available signal, represented pdnaEx1. An asserted valpEx1 signal signifies that the matched producer in EX1 is valid and that a stall should be generated if the other inputs of the first AND gate 30 are also asserted (i.e., there is a data-dependency and a hazard). If the matched producer in EX1 is not valid (valpEx1 is not asserted), then a stall will not be generated based on the data-dependency on that matched producer in EX1.

Figure 5:
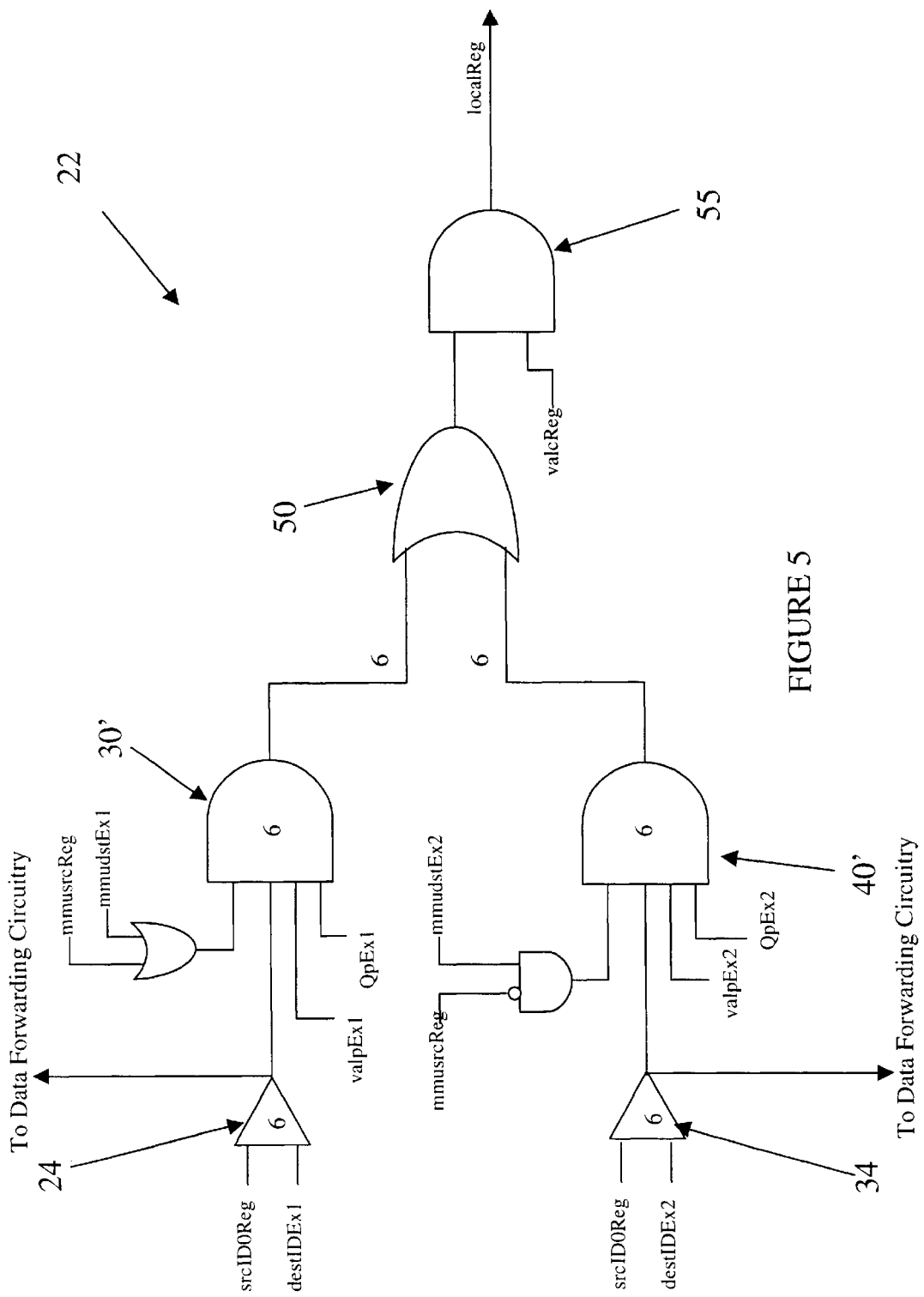
FIG. 5 is a logic circuit diagram of an alternative simplified data-dependency hazard detection.

In an alternative embodiment shown in FIG. 5, there may also be an additional input to the first AND gate 30'. This input is QpEx1, which is a qualifying predicate for the matched producer in EX1. If the qualifying predicate is asserted, then the matched producer in EX1 will be normally executed. If the qualifying predicate is not asserted, then the matched producer in EX1 will not be executed and it will not produce data. If the qualifying predicate for a matched producer in EX1 is not asserted, then there will be no local stall generated on its account (since the first AND gate 30 output will be not asserted). Accordingly, the qualifying predicate is an alternative way of signifying whether it is necessary to generate a local stall for a given matched producer.

The producer data not available signal, or pdnaEx1, indicates whether there is a data-dependency hazard for the matched producer. The pdnaEx1 signal characterizes the matched producer with the producer type or the attributes of the producer. Alternatively, pdnaEx1 characterizes the relationship of the matched producer with the attributes of the consumer. If the data is not available from the matched producer, then there is a data-dependency hazard for the consumer.

Certain producer instructions have different latencies, such as taking one cycle or more to compute. Depending on the cycle, the results of an instruction with multiple-cycle latency may not be available, while the results of an instruction with single-cycle latency will be available. Accordingly, the characterization determines the latency of the producer in the EX1. If the latency and the current cycle are such that the instruction is not yet calculated, then the matched producer data is not available and the pdnaEx1 is asserted. If pdnaEx1 is asserted and the other two inputs in the first AND gate 30 are also asserted for the matched producer, then there is a data-dependency hazard in the EX1 stage.

The generation of the pdnaEx1 signal is implementation specific. For example, if the matched producer in EX1 has a 2-cycle latency, then pdnaEx1 will be asserted when the matched: producer is in EX1, but, a pdnaEx2 signal will not be asserted when it is in Ex2 (see below). If the matched producer has a 3-cycle latency, then pdnaEx1 will be asserted when the matched producer is in EX1, and the pdnaEx2 signal will be asserted when it is in EX2 (see below). Likewise, if the matched producer has a 4-cycle latency, then pdnaEx1 will be asserted when the matched producer is in EX1, pdnaEx2 will be asserted when it is in EX2, and a pdnaWrb signal will be asserted when it is in WRB (see below).

As a specific example, some implementations involve multi-media ("mmu") instructions, as seen in FIG. 5. The pdnaEx1 signal is generated by ORing together two signals, mmusrcReg and mmudstEx1, with an OR gate 32. The mmusrcReg signal is asserted if the consumer is a mmu-type instruction in REG, i.e., there is a mmu consumer. The mmudstEx1 is asserted if the matched producer is a mmu-type instruction in EX1, i.e., there is a mmu producer. The mmu-type producer instruction has a 2-cycle latency to another mmu-type consumer instruction. Therefore, if the matched producer is a mmu producer in the EX1, there will be a data-dependency hazard since a consumer in REG is only one stage behind the EX1 stage. As a result, a local stall will be generated if the other two inputs in the first AND gate 30 are also asserted for the matched producer.

For the EX2 portion of the simplified hazard detection 22 in FIG. 5, the calculation of pdnaEx2 is different. The pdnaEx2 signal is generated by ANDing together a NOT mmusrcReg and mmudstEX2. As stated above, a mmu-type producer instruction has a 2-cycle latency to another mmu-type consumer instruction. However, when the mmu-type producer instruction has moved to EX2, the 2-cycle latency for a mmu-type consumer instruction in REG has been satisfied. Consequently, pdnaEx2 will not be asserted if there is a mmu-type consumer instruction in REG (NOT mmusrcReg is not asserted). If the consumer instruction in REG is not an mmu-type instruction, i.e., NOT mmusrcReg is asserted, the mmu-type producer instruction will have a 3-cycle latency. Accordingly, there will be a data-dependency hazard for the source operand in REG and pdnaEx2 will be asserted.

Returning to FIG. 4, a second comparator 34 has as its inputs source operand in REG and destination operand in EX2, srcID0Reg and destIDEx2, respectively. Like the first comparator 24 described above, the second comparator 34 compares the srcID0Reg against destIDEx2 for six (6) possible producers in the EX2 stage. If a data-dependency is found, the second comparator 34 asserts an output on the wire for the matched producer in EX2 to a second AND gate 40.

The second AND gate 40 includes a producer data not available input, the pdnaEx2 signal mentioned above. The pdnaEx2 signal performs the same function as pdnaEx1 for the first AND gate 30, only it is concerned with the matched producer in EX2. Accordingly, if producer data is not available for the matched producer in EX2, pdnaEx2 will be asserted. In this situation, both inputs to the second AND gate 40 will be asserted. Consequently, the second AND gate 40 output will be asserted, indicating a data-dependency hazard in EX2 for that producer.

The outputs of the first AND gate 30 and the second AND gate 40 are the results of the operand calculations described above. These outputs are ORed together by the OR gate 50. Since there are six pipelines, and hence, six producers for this example, the OR gate 50 performs an OR function on the outputs of the first AND gate 30 and the second AND gate 40 for each producer. Therefore, if the results of the operand calculations show that there is a data-dependency hazard for any one of the six producers in either the EX1 stage or the EX2 stage, the output of the OR gate 50 will be asserted. An asserted OR gate 50 output indicates that a local stall should be generated for the consumer in REG.

Before generating a local stall and asserting localReg based on the asserted OR gate 50 output, the simplified data-dependency hazard detection 22 performs one more operation. The OR gate 50 output is ANDed with a valid consumer in REG signal valcReg, by AND gate 55. If the consumer in REG is not valid, the valcReg signal is not asserted, and a local stall will not be generated for that consumer. If the consumer in REG is valid, however, valcReg will be asserted and a local stall will be generated for that local consumer; i.e., localReg will be asserted.

Figure 6:
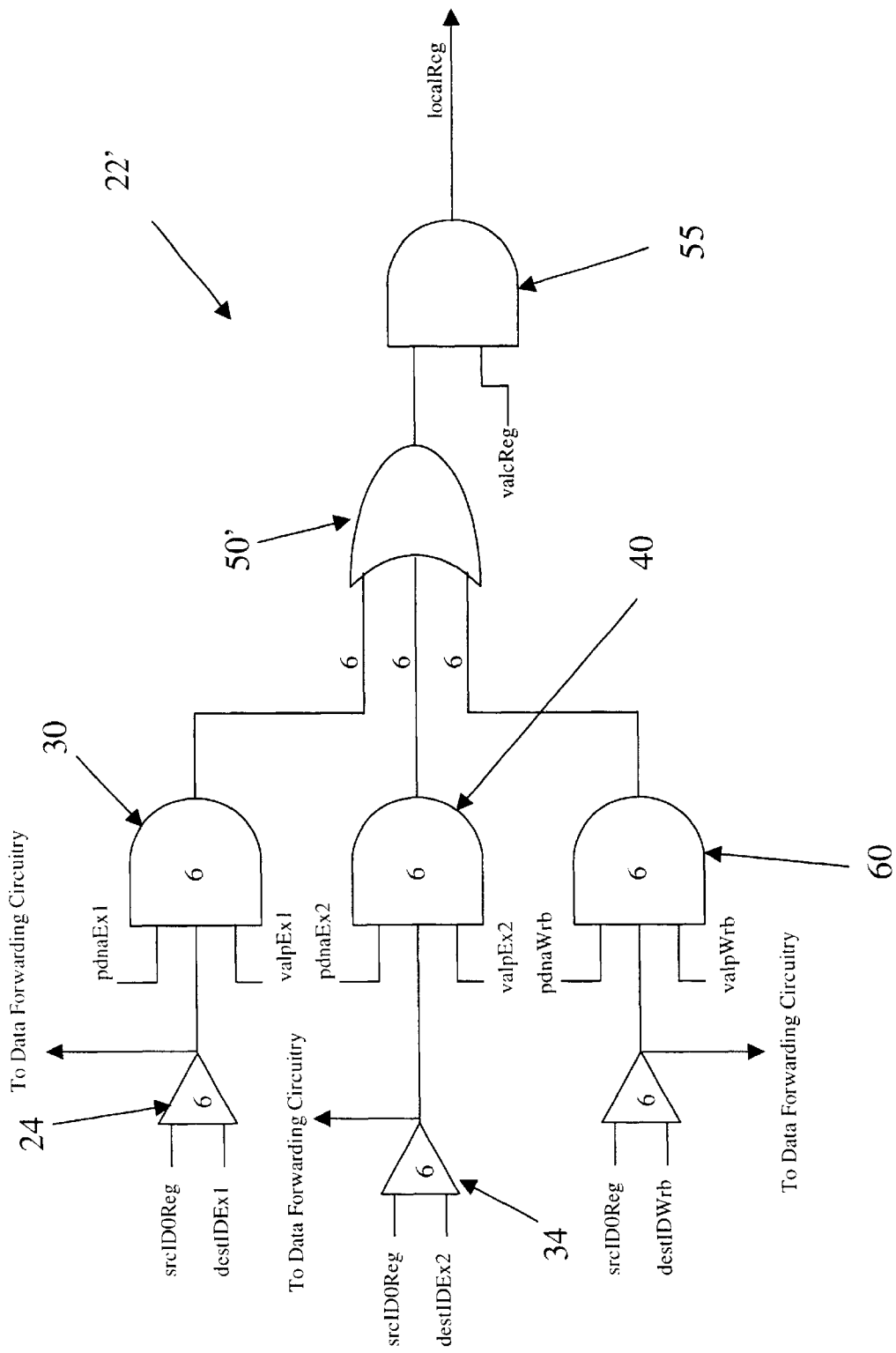
FIG. 6 is a logic circuit diagram of an another simplified data-dependency hazard detection.

FIG. 6 illustrates an alternative simplified hazard detection 22'. In this embodiment, there are three inputs into the OR gate 50'. The third input is from a third AND 60, which evaluates the matched producers in the write-back stage WRB of the six pipelines. Producers in the WRB stage, upon which the consumer in REG is data-dependent, can cause a stall if they are 4-cycle latency instructions. The signal pdnaWrb mentioned above will be asserted if a 4-cycle latency producer in WRB matches with the consumer in REG (i.e., the consumer in REG is data-dependent on the producer in WRB). Otherwise, the inputs for the third AND 60 are generated in a manner similar to the inputs for the first AND gate 30 and second AND gate 40 described above.

Figure 7:
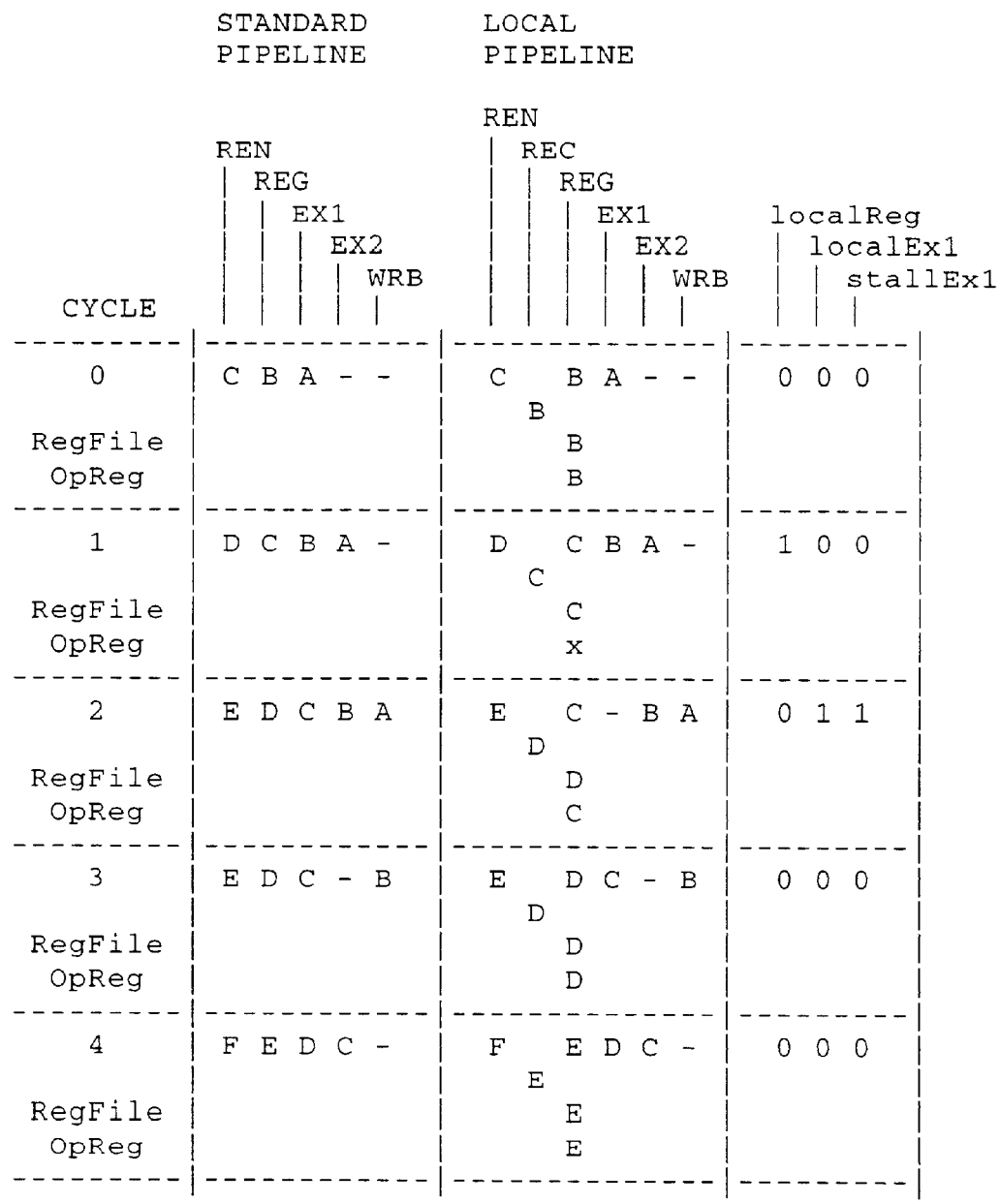
FIG. 7 is a chart illustrating the operation of the superscalar, pipelined microprocessor according to the present invention.

A method utilizing the local stall to avoid re-read of register file is illustrated by FIG. 7. FIG. 7 is a chart illustrating the operation of a superscalar pipeline microprocessor 10 according to the present invention. It shows instructions in the various stages of a standard pipeline (which represents other pipelines in the superscalar pipelined microprocessor 10 without a simplified data-dependency hazard detection 22) and the local pipeline 16 through five clock cycles (0–4). The stages include REN, REG, EX1, EX2 and WRB in both the standard pipeline and the local pipeline 16. Additionally, the local pipeline 16 is a standard pipeline modified according to the present invention to include a recovery latch REC.

The chart also shows the values of localReg, localEx1, and stallEx1 in a given cycle. As described above, localReg is the local stall in the REG stage. LocalEx1 is the local stall in the EX1 stage—this is accomplished, for example, by passing localReg through a staging latch (not shown) which then outputs the local stall in the EX1 stage along with whatever instruction is in EX1. StallEx1 is the centralized or global stall.

When instructions reach the REN stage of standard pipelines, the RegID for the source operand(s) of that instruction are used to locate the data for the source operand(s) from the register file. When instructions reach the REG stage, data for the source operand(s) is read from the location specified in the register file by the RegID. The register file follows the standard pipeline rules (i.e., it does not need to observe the local stall). Therefore, when a global stall is asserted, the register file will observe the global stall and re-supply, during the next stage, the operand for the instruction currently in REG.

Accordingly, below the instructions in each cycle, the chart shows the instruction whose source operand data is being read from the register file in the local pipeline during that cycle (in the row labeled "RegFile"). The data that is read from the register file is normally read into a operand register to be used in the instruction execution stages (e.g., EX1 and EX2). However, if the instruction is data-dependent (a consumer) on an instruction in a later stage (a producer) that is in-flight, the data-forwarding architecture may forward source operand data from the producer directly into the operand register. Accordingly, below the RegFile row in each cycle, the chart shows the instruction whose source operand data is read into the operand register during that cycle (in the row labeled "opReg").

In cycle 0, instructions C, B, and A are in the REN, REG, and EX1 stages, respectively, of the standard pipeline and local pipeline 16. As is discussed in greater detail below, the REC latch in the local pipeline 16 is in parallel with the REG stage. The REC latch is not an additional stage. Accordingly, in cycle 0, the REC latch contains the same instruction as the REG stage, instruction B. In cycle 0, localReg, localEx1, and stallEx1 are all not asserted; i.e., there is no local or central stall.

Since instruction C is in the REN stage, the RegID of the source operand data for instruction C is acquired by the register file in cycle 0. Further, the RegFile row shows that the source operand data for instruction B, which is in the REG stage, is read from the register file in cycle 0. Since localReg is not asserted, the source operand data for instruction B is known to be correct. Likewise, the OpReg row shows that the instruction B source operand data is read into the operand register for use in the execution stage(s).

In cycle 1 all instructions are forwarded one stage and a new instruction D is fetched into the REN stage of the standard pipeline and local pipeline 16. The REC latch in the local pipeline 16 again contains the same instruction as the REG stage, instruction C. In cycle 1, localReg, localEx1, and stallEx1 are all not asserted; i.e., there is no local or central stall.

Since instruction D is in the REN stage, the RegID of the source operand data for instruction D is acquired by the register file in cycle 1. Likewise, since instruction C's source operand data RegID was acquired in cycle 0, the RegFile row shows that the source operand data for instruction C, which is in the REG stage, is read from the register file in cycle 1. Since localReg is not asserted, the source operand data for instruction C is known to be correct. Likewise, the OpReg row shows that the instruction C source operand data is read into the operand register for use in the execution stage(s).

In cycle 2, the instructions are again all forwarded one stage and a new instruction E is fetched into the REN stage of the standard pipeline and local pipeline 16. Since instruction E is fetched into the REN stage, the RegID for the source operand data for instruction E is acquired in cycle 2. The RegFile row indicates that the source operand data for instruction D is read from the register file in cycle 2, since instruction D's RegID was acquired in cycle 2. Likewise, the OpReg row shows that the instruction D source operand data is read into the operand register for use in the execution stage(s).

Neither localReg or localEX1 are asserted, but a global stall stallEX1 is asserted in cycle 2. Accordingly, the instructions in both pipelines in the stages preceding and including EX1 remain stationary in cycle 3, while the instructions in the later stages EX2 and WRB are unaffected and are forwarded to the EX2 stage and out of the standard pipeline. When instruction A is forwarded out of the standard pipeline, it is committed to architectural state.

Since there was no local stall asserted in cycle 1, there was no data-dependency hazard for instruction C in the local pipeline, and the data read from the source register by the instruction C in the local pipeline is known to be correct. Since this data is known to be correct, a re-read for instruction C in cycle 2 is not necessary and can be avoided, unlike the prior art. Consequently, the source operand data for instruction C is held and no re-read of the source register for instruction C is conducted.

As stated above, the register file follows standard pipeline rules. Accordingly, despite the RegID for instruction E being obtained in cycle 2, the register file obeys the global stall and the same instruction D is shown in the RegFile and OpReg rows in both cycles 2 and 3. This does not represent a re-read of the register file for instruction D, but, it does illustrate that no re-read is being conducted for instruction C in cycle 2.

In cycle 4, the standard pipeline and local pipeline 16 behave normally, since there are no local or global stalls asserted. Instruction B is forwarded out of both pipelines, instructions C, D, and E are each forwarded one stage, and new instruction F is fetched into the REN stage of both pipelines. Instruction E is also in the REC latch in the local pipeline 16.

Likewise, since instruction E remained in the REN stage in cycle 3, the source operand data for instruction E is read from the register file in cycle 4 (as shown by the E in the RegFile row). Moreover, since the local pipeline is behaving normally and there are no local data-dependency hazards, the source operand data for instruction E is read into the operand register in cycle 4.

In sum, FIG. 7 illustrates that the present invention obviates re-reading of register data if no local stall is asserted. In FIG. 7, the instruction C is forwarded the EX1 stage in cycle 2 since there is no local stall asserted in cycle 1. In cycle 2, a global stall is asserted and all the instructions prior to and including the EX1 stage, including instruction C, are held in the local pipeline. However, since there was no local stall asserted, the data for instruction C is known to be correct and it is unnecessary to re-read the register file for instruction C.

As discussed above, the global stall is an OR function of all the local stalls, and if the local stall concerning the local pipeline is not asserted, the global stall is of less import to instruction C in the local pipeline since the data-dependency hazard causing the global stall does not affect instruction C in the local pipeline. This is why the data in instruction C in the local pipeline is known to be correct, despite the occurrence of a global stall, if there is no local stall.

However, in a parallel standard pipeline incapable of generating a local stall, it is not known whether the data-dependency hazard causing the global stall affects the operands for instruction C. Consequently, it is unknown whether the data for instruction C in the parallel standard pipeline is correct or not. Therefore, the pipeline must assume that the source operand data for instruction C is incorrect and must re-compute the source operand data, which includes a re-read of the register file during the pendency of the global stall to ensure that it is correct.

FIG. 8 illustrates pipeline performance with a local stall asserted. In the first two cycles, both pipelines behave as above in FIG. 7. In cycle 2, known as the mismatch cycle, the effects of the local stall in the REG stage are seen. The instructions are all forwarded one stage in the standard pipeline, and a new instruction E is fetched into both pipelines in the REN stage. Due to the local stall asserted in cycle 1, however, only instructions A and B are forwarded in the local pipeline 16. This mismatch between the standard pipeline and the local pipeline 16 illustrates the effect and advantages of the local stall.

Since the local pipeline 16 is alerted to the local data-dependency hazard for the consumer in REG (instruction C) and a matched producer (for example, instruction A), it knows that the data read by the consumer from its source register during cycle 1 is not correct. Since the local stall is asserted in cycle 1 while the consumer is still in REG, the local pipeline 16 can hold the consumer in REG to allow the producer to finish its operation. Accordingly, instruction C is held in the REG stage in cycle 2, during which the matched producer (for example, instruction A) finishes its operation. By holding instruction C in the REG stage until the local stall is de-asserted (indicating that the matched producer's data is available), the necessity of re-calculating the data-forwarding architecture is avoided.

Since instruction C is held in the REG stage, and instruction B has moved forward to the EX2 stage, EX1 is empty. Likewise, since instruction C is still in the REG stage in the local pipeline, whereas it normally would be in EX1 (e.g., see the standard pipeline), instruction D is retained in the REC latch. Instruction D is retained in the REC latch, which is in parallel with the REG stage, so that it is not lost when instruction C is held in the REG stage. LocalReg is now not asserted, indicating that there is no more local data-dependency hazards for the consumer in the REG stage (instruction C) and that the matched producer for instruction C has a 3-cycle latency (hence, a 1-cycle stall because of the one stage separation of consumer instruction C, and in this example, matched producer instruction A). Accordingly, the matched producer data is now available. LocalEx1 is asserted since the local stall has moved from REG to EX1. Likewise, stallEx1 is now asserted, reflecting the global stall generated as a result of the local data-dependency hazard detected and asserted by the simplified data-dependency hazard detection 22 in cycle 1. That the global stall is not asserted until cycle 2 illustrates the delay involved in generating a global stall and underlines the advantages of generating a local stall.

Since instruction E is fetched into the REN stage, the RegID for the source operand data for instruction E is acquired in cycle 2. The RegFile row indicates that the source operand data for instruction D is read from the register file in cycle 2. This also illustrates that, despite instruction C remaining in the REG stage due to the asserted localReg, there is no re-read of the register file for instruction C. The register file does not re-use the RegID of the source operand data for instruction C, but utilizes the RegID of the source operand data for instruction D, which was acquired in cycle 1 when instruction D was in the REN stage, because the register file follows the standard pipeline rules (i.e., the register file does not need to observe the local stall).

Indeed, the data read from the register for instruction C in cycle 1 is discarded since it was incorrect. Instead of re-reading the register file for instruction C, the data-forwarding architecture forwards the source operand data for instruction C from the producer (for example, A) directly to the operand register, since the data from the producer is now available (see above). This is indicated by the OpReg row which shows instruction C is the instruction whose source operand data is read into the OpReg in cycle 2.

However, since the local stall (localReg) was asserted in cycle 1, it was known one cycle earlier than the global stall that the data was not available from the producer for instruction C, and therefore that the data read from the register file could be discarded. Accordingly, since instruction C was updated when its producer's data became available, and held in cycle 2 because of the local stall, the data for the operand for instruction C is correct and needs no further manipulation. This data is then held in a latch between REG and EX1 before being sent to EX1 for execution in cycle 3 (see below discussion of FIG. 11).

In cycle 3, known as the recovery cycle, all of the instructions in the stages preceding and including EX1 remain stationery in the standard pipeline, due to the global stall (stallEx1) asserted in EX1 in cycle 2. Since the global stall is asserted in EX1, the instructions in the later stages EX2 and WRB are unaffected and are forwarded to the EX2 stage and out of the standard pipeline. When instruction A is forwarded out of the standard pipeline, it is committed to architectural state.

In the local pipeline 16, however, the global stall is overrode by localEx1 and instructions C and D are forwarded to the EX1 and REG stages from the REG stage and the REC latch, respectively. Instructions C and D recover from the local stall asserted in cycle 1 and are forwarded to the following stages. Ordinarily, this recovery would be a violation of normal pipeline rules since the instructions C and D are forwarded after a global stall is asserted, in affect overriding the global stall. However, due to the local stall asserted in cycle 1 and the lack of a local stall in cycle 2, the data read by instruction C from its source register is now known to be correct. Consequently, instruction C can be forwarded to the next stage, EX1, without harm. The forwarding of instructions C and D, along with the forwarding of instructions B and A, which are unaffected by the global stall stallEx1, brings the local pipeline 16 into agreement with the standard pipeline again.

As discussed above with FIG. 7, despite the RegID for instruction E being obtained in cycle 2, since the register file follows the standard pipeline rules, instruction D is still shown in the RegFile and OpReg in cycle 3. This does not illustrate a re-read of the operand data for instruction D, but merely shows the effect of the global stall on the register file.

In cycle 4, the standard pipeline and local pipeline 16 behave normally and equivalently, since there are no local or global stalls asserted. Instruction B is forwarded out of both pipelines, instructions C, D, and E are each forwarded one stage, and new instruction F is fetched into the REN stage of both pipelines. Instruction E is also in the REC latch in the local pipeline 16.

Likewise, since instruction E remained in the REN stage in cycle 3, the source operand data for instruction E is read from the register file in cycle 4 (as shown by the E in the RegFile row). Moreover, since the local pipeline is behaving normally and there are no local data-dependency hazards, the source operand data for instruction E is read into the operand register in cycle 4.

A method utilizing the local stall to improve pipeline performance when two global stalls are asserted is illustrated by FIG. 9. The pipeline performance for cycles 0, 1, 2, and 3 are identical to the pipeline performance for cycles 0, 1, 2, and 3 in FIG. 8, as described above. As in FIG. 8, instruction C is held in the REG stage during the mismatch cycle and the local pipeline 16 again disobeys the global stall asserted in cycle 2 and forwards instructions C and D in the recovery cycle. Further, the RegFile and OpReg rows illustrate the avoidance of a re-read for instruction C data-forwarding of the producer data in cycle 2. A second global stall, however, is asserted in cycle 3 and the instructions in both the standard pipeline and local pipeline 16 remain stationary in the stages preceding and including EX1 during cycle 4. Since there was no local stall asserted in cycle 2, the local pipeline 16 obeys the second global stall and the data forwarded to instruction C is known to be correct (the data-dependency hazard that caused the second global stall is known to not have affected instruction C, since the local stall was asserted for only one cycle). Not until cycle 5 do normal pipeline functions resume in both pipelines.

Figure 10:
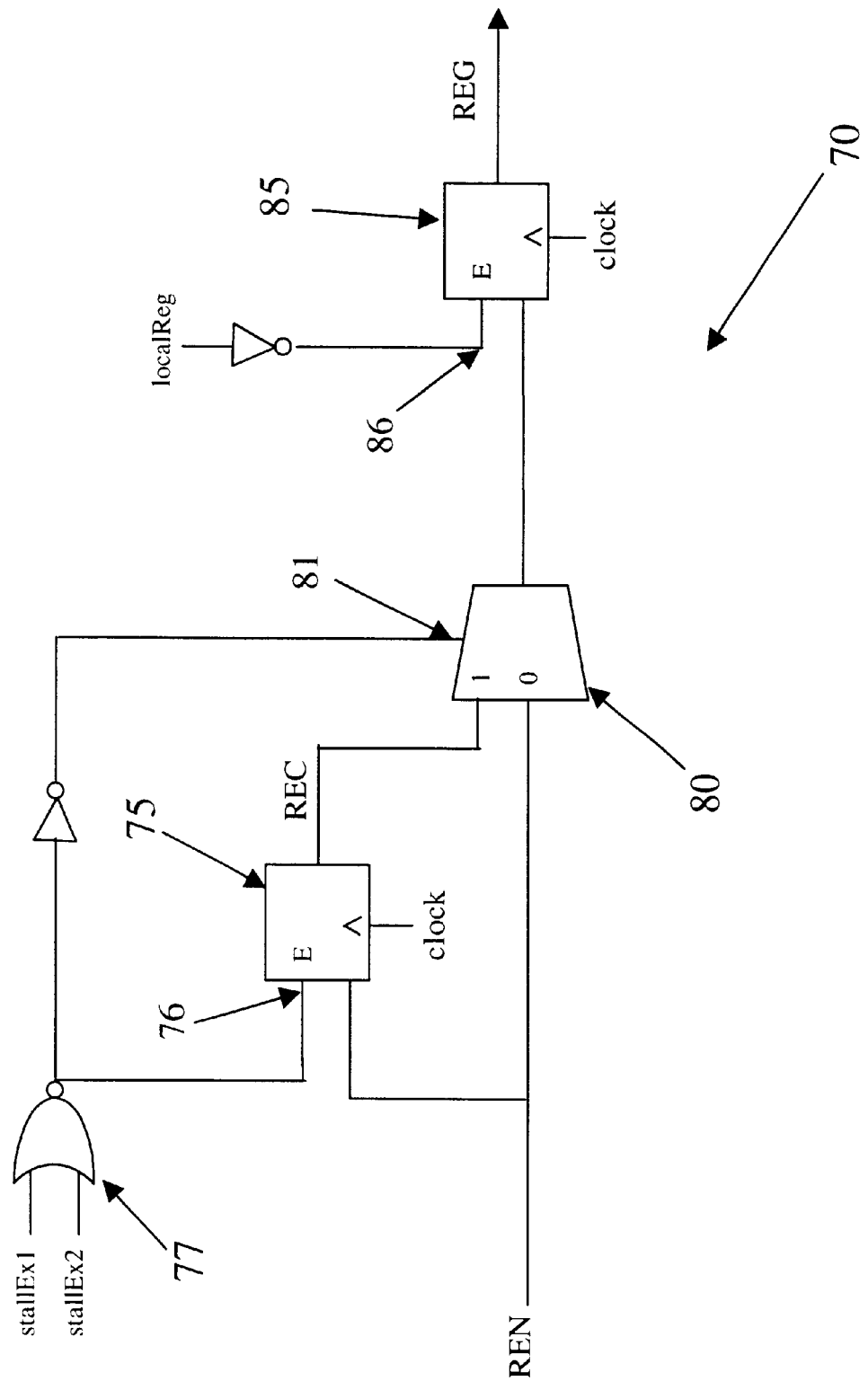
FIG. 10 is a logic circuit;diagram of a first portion of a local pipeline.

FIG. 10 illustrates a first portion 70 of the local pipeline 16 that performs according to the method described above, with reference to FIGS. 7–9. The first portion 70 of the local pipeline 16 shows the REN stage to REG stage portion of the local pipeline 16. The first portion 70 of the local pipeline 16 comprises three main components associated with the REN and REG stages: a first enable latch 75, a multiplexer 80, and a second enable latch 85. The first enable latch 75, multiplexer 80, and second enable latch 85 all have a clock input and additional inputs. The instruction in the REN stage is output to both the first enable latch 75 and the multiplexer 80, while the instruction in the second enable latch 85 is output to the REG stage.

As described above, the first enable latch 75 (the REC latch) is in parallel with the REG stage, since they both receive the output of the REN stage. The first enable latch 75 (REC) has an enabling input 76 that when asserted causes the first enable latch 75 (REC) to update with the instruction in REN. When the enabling input 76 is not asserted, the first enable latch 75 (REC) holds its present instruction. When holding its present instruction, the first enable latch 75 (REC) output to the multiplexer 80 is this held instruction.

The enabling input 76 for the first enable latch 75 is from a NOR gate 77 of stallEx1 and stallEx2. StallEx1 is the global or centralized stall described above and seen in FIGS. 7–9. StallEx2 is a second global or centralized stall from a different unit. The stallEx2 prevents instructions from writing back because exception are not yet determined. Exceptions are data overruns, errors, and are also known as faults. The write back stage WRB cannot commit the results of an instruction to the architectural state in the presence of an exception. Therefore, stallEx2 is asserted when an excepting instruction is detected in EX2 and until the exceptions are determined and resolved. With six pipelines, there are six instructions in EX2, any of which can have exceptions. The stallEx2 will prevent the excepting instruction and any younger instructions in EX2 from committing to architectural state.

Since the enabling input 76 is a NOR, if either stallEx1 or stallEx2 are asserted, then the enabling input 76 will not be asserted and the first enable latch 75 (REC) will hold its present instruction. Referring to FIG. 7, we see that this is the situation in cycle 2. StallEx1 is asserted in cycle 2, so REC holds instruction D and does not update with instruction E (which is in REN) in cycle 3. If both stallEx1 and stallEx2 are not asserted, the enabling input 76 will be asserted and the first enable latch 75 (REC) will update with the instruction from REN (as seen in cycles 1 and 4 of FIG. 7).

The multiplexer 80 receives an input from REN, an input from the first enable latch 75, and a control input 81. The "1" and "0" on the multiplexer 80 indicate that the multiplexer 80 will output the input corresponding to the "1" when its control input 81 is asserted and that it will output the input corresponding to the "0" when its control input 81 is not asserted.

The control input 81 for the multiplexer 80 is a NOT of the output of the NOR gate 77 of stallEx1 and stallEx2. In other words, the control input 81 is the NOT of the enabling input 76. If the enabling input 76 is not asserted, i.e., stallEx1 and/or stallEx2 are asserted, then the control input 81 for the multiplexer 80 will be asserted. Consequently, the multiplexer 80 will output the input from the first enable latch 75. If the enabling input 76 is asserted, i.e. stallEx1 and stallEx2 are not asserted, the control input 81 will be not be asserted, and the multiplexer will output the input from REN.

As an example, we refer to FIG. 7. In cycle 2, stallEx1 is asserted, so the control input 81 is asserted. Accordingly, in cycle 3 the multiplexer 80 outputs instruction D (which is the input from REC), which is in turn output to REG by the second enable latch 85, as is discussed below.

The second enable latch 85 has an input from the multiplexer 80 and an enabling input 86. When the enabling input is asserted, the second enable latch 85 receives the instruction output by the multiplexer 80 and updates REG with this instruction. Likewise, when the enabling input 86 is not asserted, the second enable latch 85 holds its present instruction (i.e., the present instruction is held in REG).

The enabling input 86 for the second enable latch 85 is a NOT of localReg. Therefore, if localReg is asserted in a first cycle, the enabling input 86 will not be asserted, and the second enable latch 85 will retain its output and will not update REG in the next cycle. Referring to FIG. 7, in cycle 1, localReg is asserted. Therefore, the enabling input 86 is not asserted, the second enable latch 85 holds its present instruction C, and REG is not updated between cycle 1 and cycle 2 (the instruction in REG remains instruction C). By holding instruction C in REG between cycles 1 and 2, localReg overrides the global stall, since stallEx1 is not asserted in cycle 1. The global stall is disobeyed because the data read by instruction C from its source register during cycle 1 was incorrect, due to a local data-dependency hazard, as described above.

Since localReg is not asserted in cycle 2, the enabling input 86 is asserted and the second enable latch 85 is enabled. Accordingly, the second enable latch 85 outputs instruction D to REG between cycle 2 and cycle 3, as instruction D was the input from the multiplexer 80 (see above). Again, that localReg is not asserted indicates that the data read by instruction C from its source register in cycle 2 is correct and that it may be forwarded to the EX1 stage, as described above. By updating REG between cycles 2 and 3, the local pipeline again disobeys the global stall.

Figure 11:
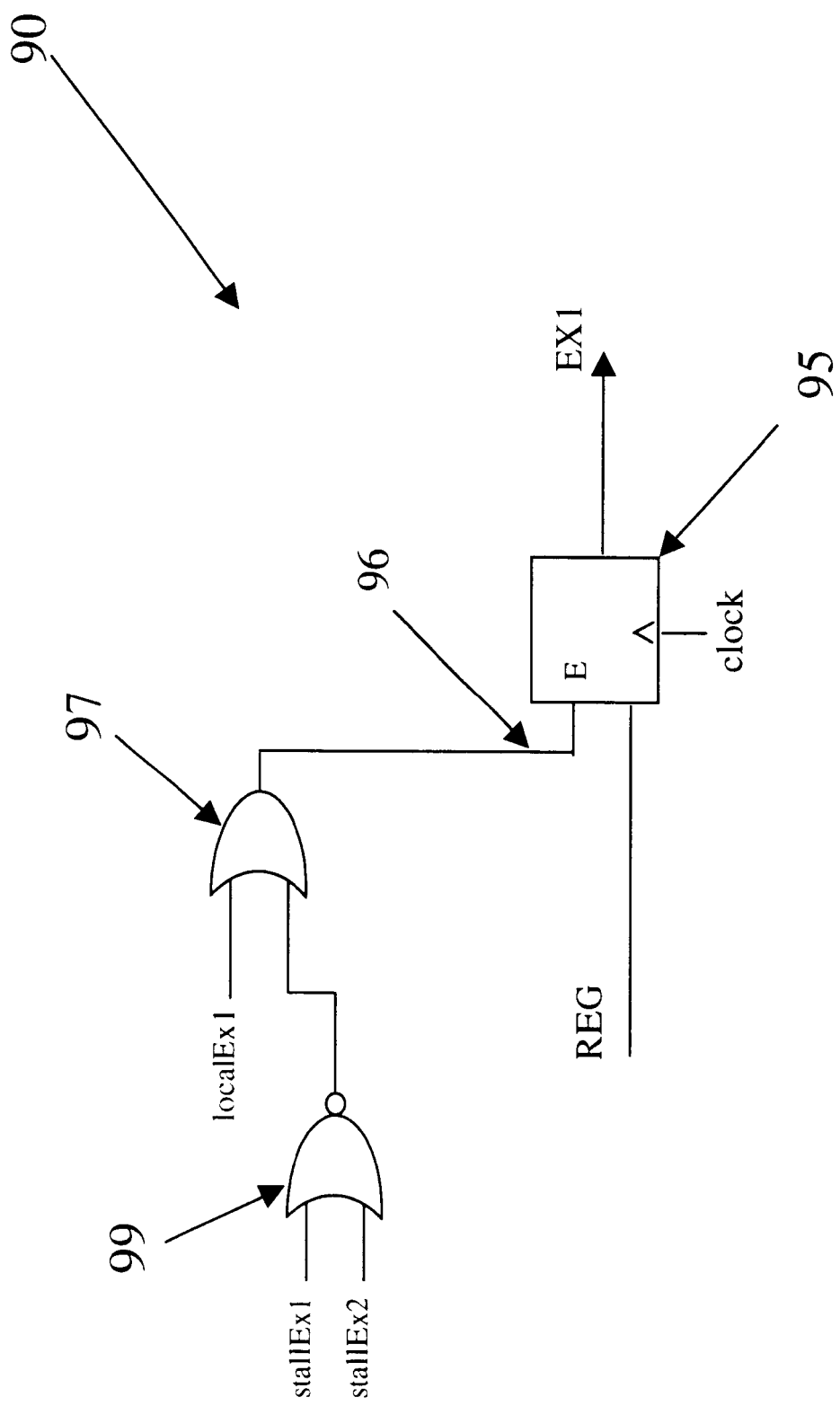
FIG. 11 is a logic circuit diagram of a second portion of the local pipeline.

A second portion 90 of an embodiment of a local pipeline 16 that performs according the method describe with reference to FIGS. 7–9, is illustrated by FIG. 11. FIG. 11 shows the REG stage to EX1 stage portion of the local pipeline 16. The second portion 90 has an enable latch 95 between the REG stage and the EX1 stage. If the enable latch 95 is enabled, the input from REG stage is output to the EX1 stage.

The enabling input 96 for the enable latch 95 is from an OR gate 97 of localEx1 and the output of a NOR gate 99 of stallEx1 and stallEx2. If there is no local stall asserted and a global stall in EX1 is asserted, i.e., localEx1 is not asserted and stallEx1 is asserted, then the enabling input 96 for the enable latch 95 will not be asserted. Accordingly, the value in REG will be held in REG and will not be output to EX1. This is the situation in cycle 2 of FIG. 7 above. As seen, the global stall is obeyed and instruction D is held in REG. Since there was no local stall in REG in cycle 1, however, the data for instruction C, which is in EX1, is known to be correct and no re-read is necessary.

However, if either localEx1 is asserted or both stallEx1 and stall Ex2 are not asserted, then the enabling input 96 for the enable latch 95 will be asserted and the input from REG stage will be output to the EX1 stage. If localEx1 is asserted and stallEx1 is also asserted, the enable latch 95 acts as an override to the global stall. It causes the local pipeline 16 to "disobey" the global stall, as discussed above, since the local stall in EX1 signifies that the data in REG is correct (if localEx1 is asserted, the local stall has moved to EX1 and is no longer asserted in REG). This is the situation that occurs on the transition between cycle 2 and cycle 3, as shown in FIG. 8, since both localEx1 and stallEx1 are asserted in cycle 2. Instruction C is forwarded from REG to EX1 through the enable latch 95 in cycle 3, even though there is a global stall in cycle 2 and ordinarily the pipeline would hold instruction C in REG. By causing the global stall to be ignored, therefore, the local stall is improving the performance of the local pipeline 16 by making it more efficient.

Therefore, in the present invention, when there is a local stall followed by a global stall, the instruction in REG stage is updated when the data is available from its producer and then held according to the global stall. Specifically, the data-forwarding architecture by-passes the register file with producer data, forwarding the producer data directly to the operand register. Likewise, in the present invention, when there is a global stall without a local stall, the instruction in the REG stage is simply forwarded to the next stage and held according to the global stall, since its data is correct. In neither case is a re-read performed or necessary, since the present method ensures that the operand data for the instruction is correct.

While the invention has been disclosed in this patent application by reference to the details of preferred embodiments of the invention, it is to be understood that the disclosure is intended in an illustrative rather than in a limiting sense, as it is contemplated that modifications will readily occur to those skilled in the art, within the spirit of the invention and the scope of the appended claims.

What we claim is:

1. A method for avoiding a re-read of a register file due to a data hazard in pipeline with multiple stages, comprising the steps of:

acquiring a register address of source operand data for a first instruction, wherein the register address points to a location of the source operand data for the first instruction in a register;

reading the source operand data out of the register for the first instruction; and determining whether a local stall is asserted in the pipeline, wherein there is a later instruction that is a producer for the first instruction and the local stall indicates that the source operand data read out of the register for the first instruction is incorrect.

2. The method of claim 1, wherein the determining step determines that a local stall is asserted and the method further comprises the steps of:

discarding the source operand data read out of the register for the first instruction.

3. The method of claim 1, wherein the determining step determines that a local stall is asserted and the method further comprises the steps of:

updating the source operand data for the first instruction with data provided by the producer when the local stall is de-asserted.

4. The method of claim 3, wherein the updating step comprises the step of data-forwarding the data provided by the producer directly to the first instruction.

5. The method of claim 3, further comprising the step of:

holding the first instruction according to a global stall, which is asserted one cycle later than the local stall.

6. The method of claim 1, wherein the determining step determines that a local stall is asserted and the method further comprises the steps of:

acquiring a register address for source operand data for a second instruction, wherein the register address points to the location of the source operand data for the second instruction data in the register;

continuing to acquire the register of the source operand data for the second instruction due to the local stall being asserted; and reading the source operand data for the second instruction out of the register.

7. The method of claim 1, wherein the determining step determines that a local stall is not asserted and the method further comprises the step of:

holding the first instruction according to a global stall, wherein the non-assertion of the local stall indicates that there was no data-dependency hazard for the first instruction and that the source operand data read out of the register for the first instruction is correct.

8. The method of claim 1, wherein the determining step determines that a local stall is not asserted and the method further comprises the step of:

acquiring a register address for source operand data for a second instruction, wherein the register address points to the location of the source operand data for the second instruction data in the register;

reading the source operand data for the second instruction out of the register; and holding the second instruction according to a global stall, wherein the non-assertion of the local stall indicates that there was no data-dependency hazard for the first instruction and that the source operand data read out of the register for the first instruction is correct.

9. The method of claim 1, wherein acquiring step is performed when the first instruction is in a REN stage and the reading step is performed when the first instruction is in a REG stage.

10. The method of claim 1, wherein the determining step determines that a local stall is not asserted and the method further comprises the step of:

avoiding re-read of the register file since non-assertion of the local stall indicates that there was no data-dependency hazard for the first instruction and that the source operand data read out of the register for the first instruction is correct.

11. An apparatus for avoiding a re-read of a register due to a data hazard in a pipeline with multiple stages, comprising:

a simplified hazard detection that detects data-dependency hazards for an instruction within the pipeline and determines whether to assert a local stall, wherein the simplified hazard detection re-uses comparators that are used for data-forwarding in the pipeline; and a logic circuitry capable of determining whether the local stall has been asserted by the simplified hazard detection, wherein the logic circuit holds the instruction in a stage of the pipeline when the local stall is asserted and wherein non-assertion of the local stall indicates that the instruction data is correct and that a re-read of a register file is not necessary.

12. The apparatus of claim 11, wherein a data-dependency hazard will also result in a global stall being asserted in the pipeline and the simplified hazard detection asserts the local stall one cycle prior to the assertion of the global stall.

13. An apparatus for avoiding a re-read of a register due to a data hazard in a pipeline with multiple stages, comprising:

a simplified hazard detection that detects data-dependency hazards for an instruction within the pipeline and determines whether to assert a local stall; and a logic circuitry capable of determining whether the local stall has been asserted by the simplified hazard detection, wherein the logic circuitry holds the instruction in a REG stage when the local stall is asserted and wherein non-assertion of the local stall indicates that the instruction data is correct and that a re-read of a register file is not necessary.

14. An apparatus for avoiding a re-read of a register due to a data hazard in a pipeline with multiple stages, comprising:

a simplified hazard detection that detects data-dependency hazards for an instruction within the pipeline and determines whether to assert a local stall; and a logic circuitry capable of determining whether the local stall has been asserted by the simplified hazard detection and wherein non-assertion of the local stall indicates that the instruction data is correct and that a re-read of a register file is not necessary and wherein the local stall is asserted sufficiently long enough to allow the instruction to receive data from a producer through a data-forwarding architecture when the producer data is available.

15. An apparatus for performing parallel processing, comprising:

a local pipeline, comprising:

a plurality of stages, wherein instructions are processed through each other the plurality of stages one stage at a time; and a recovery latch, wherein instructions are held in the recovery latch when a local stall is asserted indicating that a local data-dependency hazard has been detected; and a centralized data-dependency hazard detection that asserts a global stall that stalls instructions in the local pipeline, wherein register data for stalled instructions is not re-read when the global stall is asserted.

16. The apparatus of claim 15, wherein the local pipeline further comprises:
a simplified data-dependency hazard detection that asserts the local stall that stalls instructions in the local pipeline, wherein non-assertion of the local stall indicates a stalled instruction's data is correct and that a re-read of a register file is not necessary.

17. The apparatus of claim 16, wherein the local stall is asserted one-cycle prior to the global stall.

18. The apparatus of claim 15, further comprising a standard pipeline wherein register data for a stalled instruction is re-read when the global stall is asserted.

19. The apparatus of claim 15, further comprising data-forwarding architecture, wherein data for a stalled instruction is forward directly to the stalled instruction from a producer when the local stall is de-asserted.

* * * * *